(No Model.)

A. PALMROS.
TROLLEY DEVICE.

No. 450,184.     Patented Apr. 14, 1891.

WITNESSES
Alice A. Perkins.
Joseph W. Hankins.

INVENTOR
Alexander Palmros.
by Alban Andrén
his ATTORNEY

THE NORRIS PETERS CO., PHOTO-LITHO., WASHINGTON, D. C.

UNITED STATES PATENT OFFICE.

ALEXANDER PALMROS, OF LYNN, ASSIGNOR OF ONE-HALF TO VICTOR E. PETERSON, OF BOSTON, MASSACHUSETTS.

TROLLEY DEVICE.

SPECIFICATION forming part of Letters Patent No. 450,184, dated April 14, 1891.

Application filed January 8, 1891. Serial No. 377,098. (No model.)

*To all whom it may concern:*

Be it known that I, ALEXANDER PALMROS, a citizen of Finland, and a resident of Lynn, in the county of Essex and State of Massachusetts, have invented new and useful Improvements in Trolley Devices, of which the following, taken in connection with the accompanying drawings, is a specification.

This invention relates to improvements in trolley devices for electric railways; and it has for its object to allow the trolley-wheel to adjust itself automatically to the circuit-wire, particularly in going around curves, passing switches, or when going from a straight track to a curve or incline, or vice versa, and thus preventing said trolley-wheel from jumping the circuit-wire, as will hereinafter be more fully shown and described, reference being had to the accompanying drawings, wherein—

Figure 1:
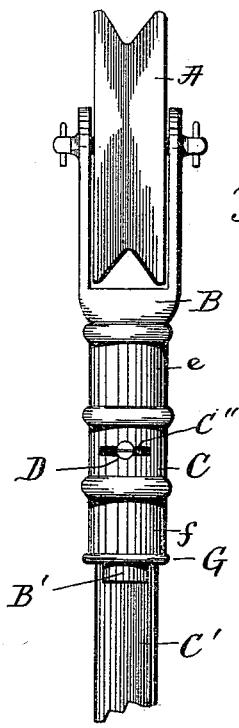
Figure 2:
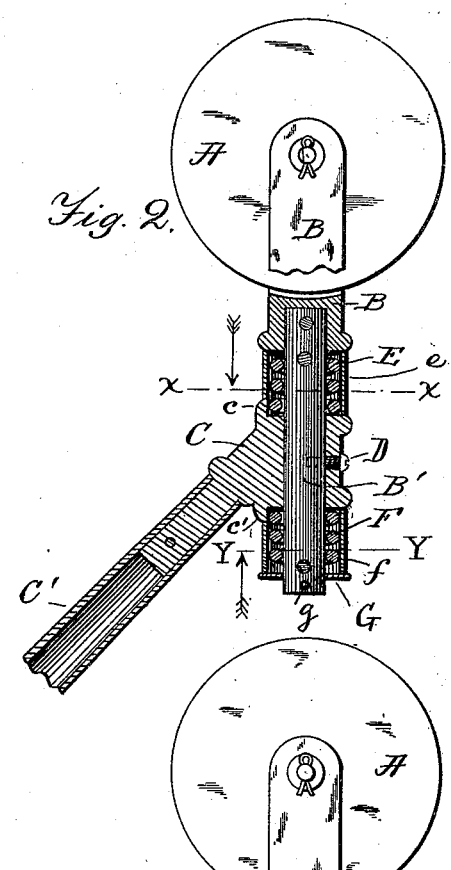
Figure 4:
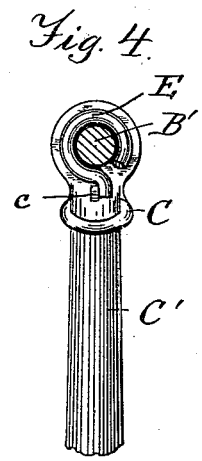
Figure 5:
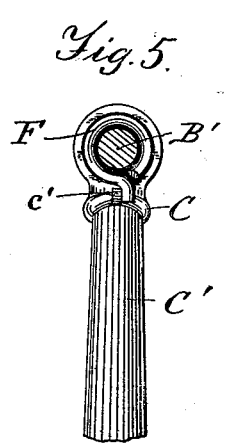
Figure 3:
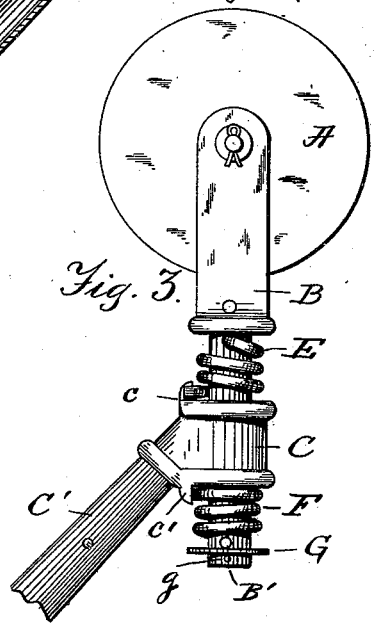

Figure 1 represents an end view of the improved trolley device; and Fig. 2 represents a central longitudinal section of the same, the wheel being shown in elevation. Fig. 3 represents a side elevation showing the spring-covering tubes as removed. Fig. 4 represents a cross-section on the line X X, shown in Fig. 2; and Fig. 5 represents a similar cross-section on the line Y Y, also shown in Fig. 2.

Similar letters refer to similar parts wherever they occur on the different parts of the drawings.

A represents the trolley-wheel loosely journaled in the forked bearing B, having secured to or made in one piece with it the downwardly-projecting pin or spindle B', which is journaled in a bearing or socket C, attached to the upper end of the trolley-pole C', as shown in the drawings.

The spindle B' is free to turn a part of a revolution around its axis in the bearing C, its motion being limited, preferably, by means of a set-screw or pin D going through a slotted perforation C'' in the socket C and fastened in the said spindle B', as shown in Figs. 1 and 2.

The spindle B' is surrounded by a spiral spring E above the bearing C, which spring has its upper end secured in a suitable manner to said spindle B' and has its lower end preferably resting against a tooth or projection $c$ on the upper end of the bearing C, as shown in Figs. 2, 3, and 4. A similar spring F surrounds the spindle B' below the bearing C, which spring is attached at its lower end in a suitable manner to the spindle B' and has its upper end preferably resting against a tooth or projection $c'$ on the lower end of the bearing C, as shown in Figs. 2, 3, and 5. The said springs E and F are wound in opposite directions—that is, one is wound to the right and the other to the left, as shown in Fig. 3—for the purpose of automatically returning the forked bearing B, its trolley-wheel A, and spindle B' to their normal central positions as soon as the said trolley-wheel enters a straight portion of the circuit-wire. The said springs E F also serves for the purpose of holding the bearing B, its trolley-wheel, and spindle with a yielding pressure in their normal central positions and to allow the trolley to adjust itself automatically to curves and inclines on the circuit-wire.

$e$ and $f$ are tubes within which the coiled springs E and F are respectively inclosed.

G is a washer on the lower end of the spindle B', and $g$ is a pin, screw, or other suitable fastening device serving to prevent the spindle B' from working out of its bearing C, as shown in Figs. 1, 2, and 3.

Having thus fully described the nature, construction, and operation of my invention, I wish to secure by Letters Patent, and claim—

The herein-described trolley device, consisting of the trolley-wheel A, having its bearing-spindle B' loosely journaled in a bearing on the trolley-pole C', and a pair of opposing coiled springs E and F, surrounding said spindle and secured to it and the trolley-pole or its bearing, substantially as and for the purpose set forth.

In testimony whereof I have signed my name to this specification, in the presence of two subscribing witnesses, on this 26th day of December, A. D. 1890.

ALEXANDER PALMROS.

Witnesses:
ALBAN ANDRÉN,
ALICE A. PERKINS.